United States Patent
Zhao et al.

[11] Patent Number: 5,923,110
[45] Date of Patent: Jul. 13, 1999

[54] SPINDLE MOTOR FOR OPTICAL DISC DRIVES

[75] Inventors: Chi-Mou Zhao, Taipei Hsien; Chin-Po Liao, Yun Lin Hsien; Shyh-Jier Wang, Hsinchu Hsien; Min-Der Wu, Tai Chung; Der-Ray Huang, Hsinchu; Tai-Fa Ying, Hsinchu Hsien; Eric-G. Lean; Han Chung Wang, both of Hsinchu; Alex Hong, Kaohsiung; Chiang Cheng Huang, Taipei; Yin-Rong Hong, Kaohsiung, all of Taiwan

[73] Assignees: Industrial Technology Research Institute; Sunonwealth Electric Machine Industry Co., Ltd., both of Taiwan

[21] Appl. No.: 08/829,656

[22] Filed: Mar. 31, 1997

[30] Foreign Application Priority Data

Mar. 17, 1997 [TW] Taiwan .................................. 86103268

[51] Int. Cl.$^6$ .............................. H02K 21/22; H02K 1/16
[52] U.S. Cl. .......................... 310/91; 310/67 R; 310/216; 310/269; 360/98.07; 360/99.04; 360/99.08
[58] Field of Search ............................... 310/67 R, 68 R, 310/216, 254, 257, 259, 269; 360/99.08, 99.04, 98.07; 369/270–290; 318/608, 632, 606; 388/805

[56] References Cited

U.S. PATENT DOCUMENTS

| | | |
|---|---|---|
| 3,860,843 | 1/1975 | Kawasaki et al. .......................... 310/67 |
| 4,812,692 | 3/1989 | Arita ....................................... 310/49 R |
| 4,843,288 | 6/1989 | Volz et al. ............................... 318/599 |
| 4,891,567 | 1/1990 | Fujitani et al. .......................... 318/254 |
| 4,899,075 | 2/1990 | Hasebe et al. ........................... 310/257 |
| 4,987,331 | 1/1991 | Horng et al. ............................ 310/254 |
| 5,093,599 | 3/1992 | Horng et al. ............................ 310/254 |
| 5,111,095 | 5/1992 | Hendershot ............................. 310/165 |
| 5,216,664 | 6/1993 | Sleegers et al. ........................ 369/278 |
| 5,519,687 | 5/1996 | Peeters .................................... 369/270 |
| 5,552,650 | 9/1996 | Cap et al. .............................. 310/67 R |
| 5,557,184 | 9/1996 | Hwang .................................... 318/608 |
| 5,636,193 | 6/1997 | Ohmi ........................................ 369/53 |
| 5,689,147 | 11/1997 | Kaneda et al. ........................... 310/216 |

*Primary Examiner*—Thomas M. Dougherty
*Assistant Examiner*—Tran N Nguyen
*Attorney, Agent, or Firm*—Finnegan, Henderson, Farabow, Garrett & Dunner, L.L.P.

[57] ABSTRACT

A spindle motor for a disc drive, such as a CD-ROM drive, is provided. This spindle motor is a brushless motor of a single-phase axial-winding and radial-gap type including a stator, a rotor coupled to said stator, and a driving circuit for supplying a driving signal to the stator to rotate the rotor. The stator includes a pair of upper and bottom salient-pole pieces formed with a plurality of tooth-like portions serving as salient-poles. The peak surface of each tooth-like portion is formed into a symmetrical convex shape, which minimizes the cogging torque of the motor. Further, the use of a phase-adjuster in the driving circuit allows the motor to produce large output torque at high speeds. The output characteristics of this spindle motor meet the requirements of high speed CD-ROM drives.

7 Claims, 5 Drawing Sheets

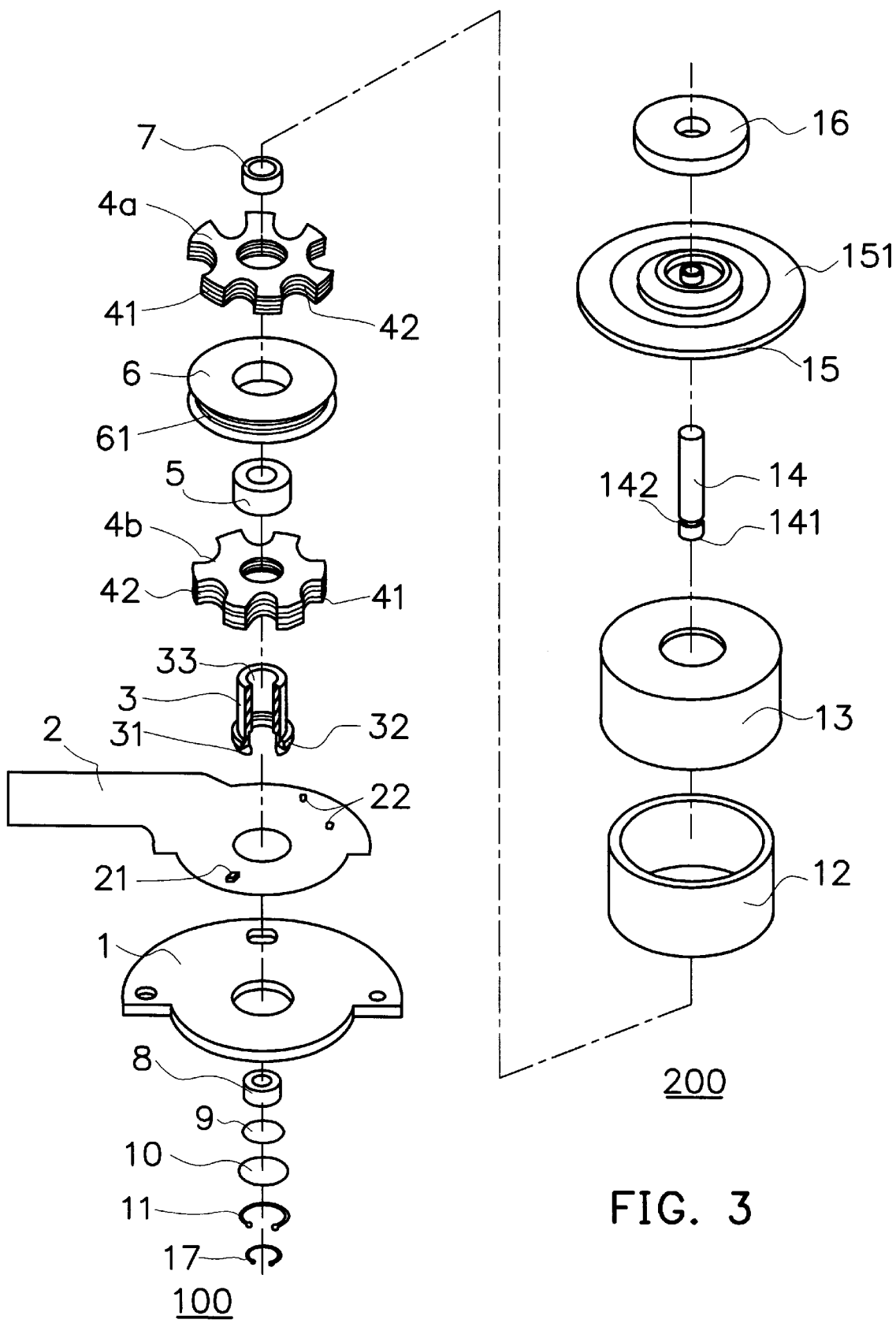

SPINDLE MOTOR FOR OPTICAL DISC DRIVES

The subject matter of this application is related to another two U.S. patent applications respectively entitled "Brushless Motor Stator Design" and "Automatic Phase Adjuster for A Brushless Motor Driving Signal" which are co-filed with this application by the Applicant.

BACKGROUND OF THE INVENTION

1. Field of the Invention

This invention relates to brushless motors, and more particularly, to a brushless motor serving as a spindle motor for a disc drive, such as a CD-ROM (compact-disc read-only memory) drive, for spinning the disc during access operations.

2. Description of Related Art

Low-speed CD-ROM drives generally utilize a three-phase axial-gap brushless motor as the spindle motor for spinning the disc during access operations. Although this type of motor is low in performance and output torque, it is still widely used as the spindle motor for the CD-ROM drives since it does not produce the so-called cogging torque that seriously deteriorates the performance of the motor. Another drawback of this type of motor is that coils for the stator are difficult to wind and mount on the circuit boards.

High-speed CD-ROM drives, on the other hand, generally utilize a three-phase radial-gap brushless motor as the spindle motor for spinning the disc. This type of motor can spin the disc with high speed. However, one drawback to this type of motor is that its stator, whether of the 8-pole 9-slot type or the 12-pole 9-slot type, is constructed with salient type salientpoles which make winding the coils thereon difficult and laborious. The coil easily breaks down, is difficult to insulate, and has poor reliability.

Still one further drawback of the three-phase brushless motor is that it needs three Hall sensors for phase detection and six power transistors for its driving circuits. This large number of components causes the manufacturing cost of the motor to be very high.

Single-phase axial-winding and radial-gap motors are disclosed in U.S. Pat. Nos. 4,891,567; 4,899,075; 4,987,331; and 5,093,599, to name a few. In these motors, the coils are wound on a plastic bobbin in one axial direction only, which allows easy and less laborious winding of the coils to be, a high production yield, and ease of providing insulation thereto. Still, the component cost for these motors is low since only one Hall sensor for phase detection and four power transistors on the driving circuit are needed. The overall manufacturing cost of these motors is thus significantly lower than the above-mentioned three-phase brushless motors. However, there are still drawbacks to these single-phase motors, in that they will produce large torque ripples and cogging torque, such that the torque-versus-speed characteristic is very poor. This means that the output torque will be very low when operating at high speeds. For this reason, these single-phase motors are generally utilized in low-precision and fixed-speed applications, such as to drive a fan motor for cooling electric devices.

Most conventional CD-ROM drives utilize a three-phase axial-gap or radial-gap brushless motor as the spindle motor for spinning the disc. If single-phase brushless motors are employed to serve as the spindle motor for CD-ROM drives, they have the advantages of low manufacturing cost, high production yield, and ease of construction. But one prerequisite for this is elimination of the above-mentioned drawbacks of the conventional single-phase brushless motors.

SUMMARY OF THE INVENTION

It is therefore a primary objective of the present invention to provide a single-phase spindle motor which has high performance for use on high-speed CD-ROM drives.

In accordance with the foregoing and other objectives of the present invention, a new and improved single-phase brushless motor for a CD-ROM drive is provided. The spindle motor includes a stator, a rotor coupled to the stator, and a driving circuit for providing excitation to the stator. The stator is formed with a plurality of tooth-like portions serving as salientpoles, each tooth-like portion having a peak surface formed into a symmetrical convex shape, which allows for a decrease in the cogging torque of the spindle motor. The rotor is coupled to the stator to be rotated by the stator. The driving circuit is coupled to the stator for supplying excitation that serves as a driving signal to the stator to rotate the rotor.

Further, the driving circuit includes a speed sensor for sensing the speed of the spindle motor to thereby generate a speed signal indicative of the current speed of the spindle motor; and a phase-adjuster, in response to the speed signal, for adjusting the phase of the driving signal to allow the spindle motor to output optimal torque at high speed.

The peak surface of each tooth-like portion is formed into a symmetrical convex shape, which allows the cogging torque of the motor to be minimized. Further, the use of a phase-adjuster in the driving circuit allows the motor to produce large output torque at high speeds. The output characteristics of this spindle motor meet the requirements of high speed CD-ROM drives.

BRIEF DESCRIPTION OF DRAWINGS

The invention can be more fully understood by reading the following detailed description of the preferred embodiments, with reference made to the accompanying drawings, wherein:

FIG. 2 is an exploded perspective view of the stator of the spindle motor of FIG. 1;

FIG. 3 is an exploded perspective view of the rotor of the spindle motor of FIG. 1;

DETAILED DESCRIPTION OF PREFERRED EMBODIMENT

FIGS. 1 through 4 show the spindle motor according to the present invention, which is a single-phase axial-winding and radial-air-gap type of brushless motor for a CD-ROM drive to spin an optical disc thereon during access operations. This spindle motor includes a stator 100, a rotor 200, and a driving circuit 300.

Figure 4:
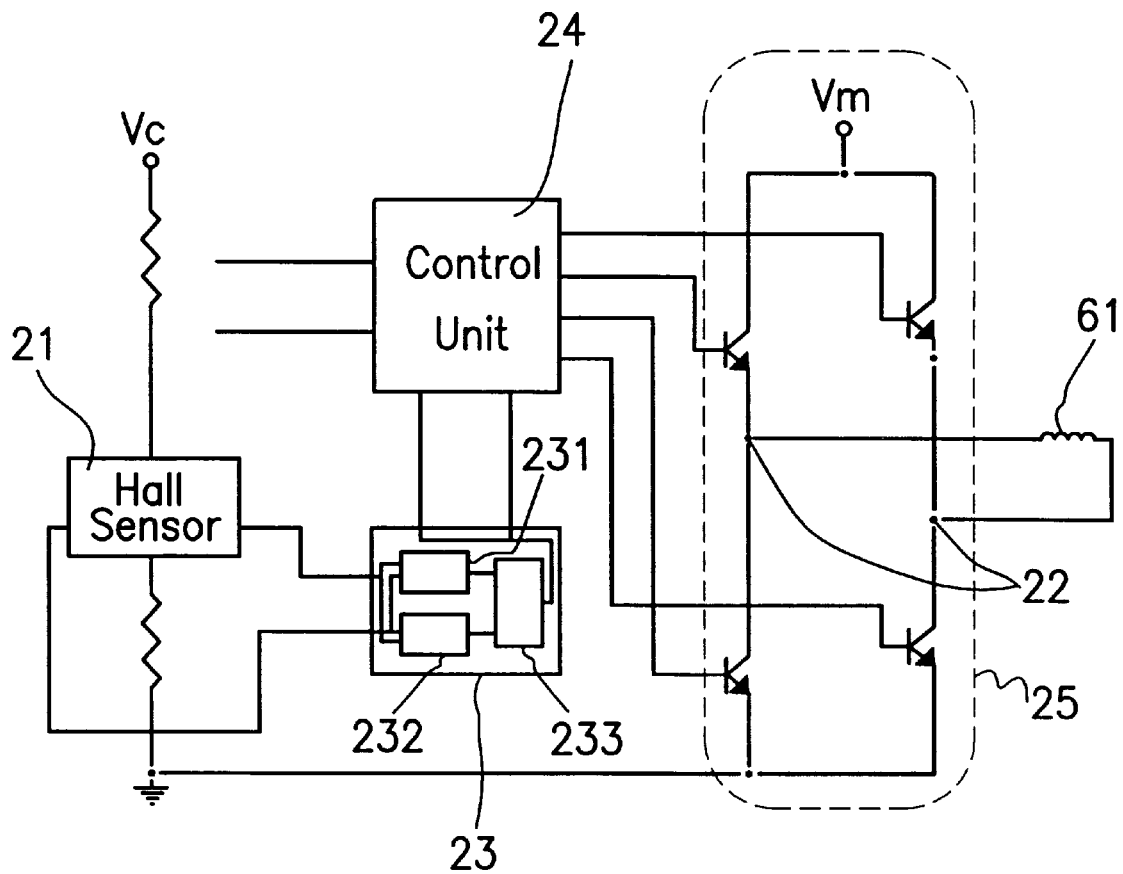
FIG. 4 is a schematic diagram of a driving circuit devised to drive the spindle motor of FIG. 1.

As shown in FIG. 2, the stator 100 includes a mounting member 1, a circuit board 2, a flux-guiding sleeve 3, an upper salient-pole piece 4a, a bottom salient-pole piece 4b, a flux-guiding ring 5, a bobbin 6 around which a coil 61 is wound, and a plurality of bearings 7, 8. Further, as shown in FIG. 3, the rotor 200 includes a ring-shaped magnet 12, a yoke 13, a spindle (shaft) 14, a turntable 15, and a turntable magnet 16. Still further, as shown in FIG. 4, the driving circuit 300 includes a Hall sensor 21, a phase-adjuster 23, a control unit 24, and a bridge-type circuit 25.

Referring back to FIG. 2, in the stator 100, the circuit board 2 is mounted on the mounting member 1 which is a supporting plate made of a non-magnetic material with even thickness. The flux-guiding sleeve 3, on the other hand, is made of a magnetic material having a bore 33 with a precisely shaped inner diameter for coupling the bearings 7, 8 securely therein. The bearings 7, 8 are aligned on the same axis so that the turntable 15 in the rotor 200 can be rotated without undulation. The flux-guiding sleeve 3 has a supporting flange 32 which is projected at a right angle from the bottom edge of the flux-guiding sleeve 3. This supporting flange 32 is used to support the bottom salient-pole piece 4b, the ring 5, and the upper salient-pole piece 4a when these components are coupled axially to the flux-guiding sleeve 3. This also allows the turntable 15 in the rotor 200 to be supported levelly thereon when the rotor 200 is coupled to the stator 100. The flux-guiding sleeve 3 is further formed with a coupling mouth 31 which is used to fasten the flux-guiding sleeve 3 onto the mounting member 1 through punching. The axis of the flux-guiding sleeve 3 is substantially at a right angle to the top surface of the mounting member 1. The flux-guiding ring 5 is made of a magnetic material in stacked structure having an insulated inner wall in the center hole.

The spindle motor further includes a frictional piece 9, a stopper 10 for supporting the frictional piece 9, a stopper locking ring 11 for locking on the stopper 10, and a spindle locking ring 17 for locking on the shaft 14. The flux-guiding sleeve 3 is used to support the spindle 14 in the rotor 200. As shown in FIG. 3, the spindle 14 is formed with a circular slot 142 near the bottom end. When the spindle 14 is mounted in position in the bore 33 of the flux-guiding sleeve 3, the bottom end 141 of the spindle 14 is abutted on the frictional piece 9 which can support the spinning of the spindle 14, and the spindle locking ring 17 is inset in the circular slot 142 of the spindle 14 so as to lock the spindle 14 securely in position.

Figure 6:
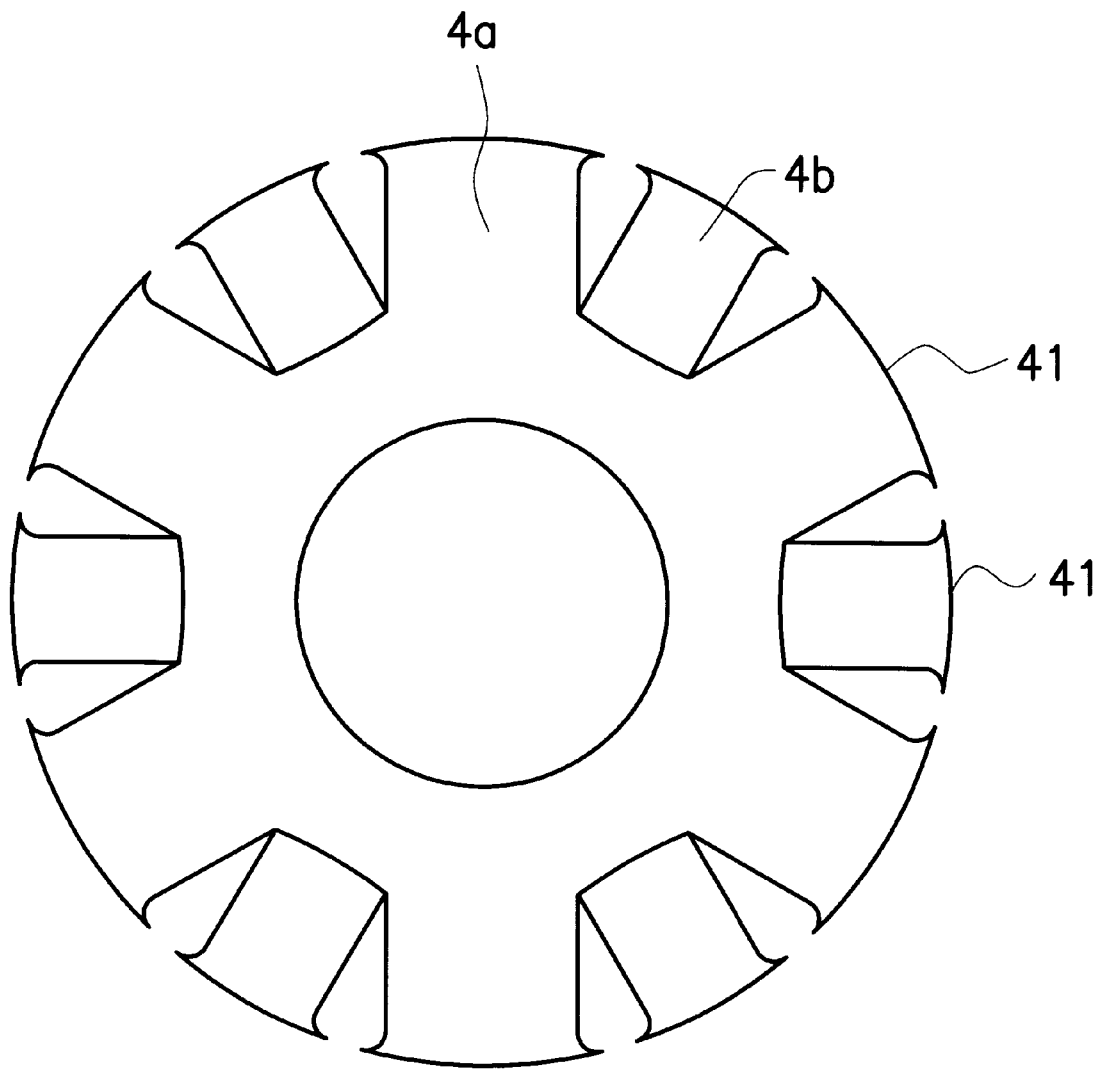
FIG. 6 is a top view of salient-pole pieces of the spindle motor of FIG. 1.

To assemble, the flux-guiding ring 5 is inset in the center hole of the bobbin 6, and then the bottom salient-pole piece 4b, the flux-guiding ring 5 along with the coupled bobbin 6, and the upper salient-pole piece 4a are successively mounted onto the flux-guiding sleeve 3, with the supporting flange 32 on the bottom end of the flux-guiding sleeve 3 supporting these components. This forms a salient-pole structure for the stator 100. The upper and bottom salient-pole pieces 4a, 4b are each a stack of silicon-steel plates 42 formed with a plurality of tooth-like portions 41. The number of these tooth-like portions 41 on each of the upper and bottom salient-pole pieces 4a, 4b can be in the range from 4 to 8, and preferably 6 as illustrated in FIG. 2. As, shown in FIG. 6, the peak surface of each of the tooth-like portions 41 is formed into a symmetrical convex shape with a small radius of curvature, which can minimize the cogging torque of the motor; while the valley surfaces at the intervals between the tooth-like portions 41 are each formed with a concave curvature, which can reduce the amount of magnetic flux flowing therethrough to thereby increase the output torque of the motor. The upper and bottom salient-pole pieces 4a, 4b are oriented in such a manner that they are separated by an electrical angle of 180° so as to form a 12-pole structure.

The coil 61 on the bobbin 6 shown in FIG. 2 has two ends connected respectively to a pair of electrical contacts 22 on the circuit board 2 on which the driving circuit 300 is mounted. The flux-guiding sleeve 3 and the flux-guiding ring 5 are used to guide the magnetic flux flowing through the upper and bottom salient-pole pieces 4a, 4b. When excitation is applied to the coil 61, the tooth-like portions 41 will be turned into salientpoles for the stator 100 to spin the spindle 14.

Figure 1:
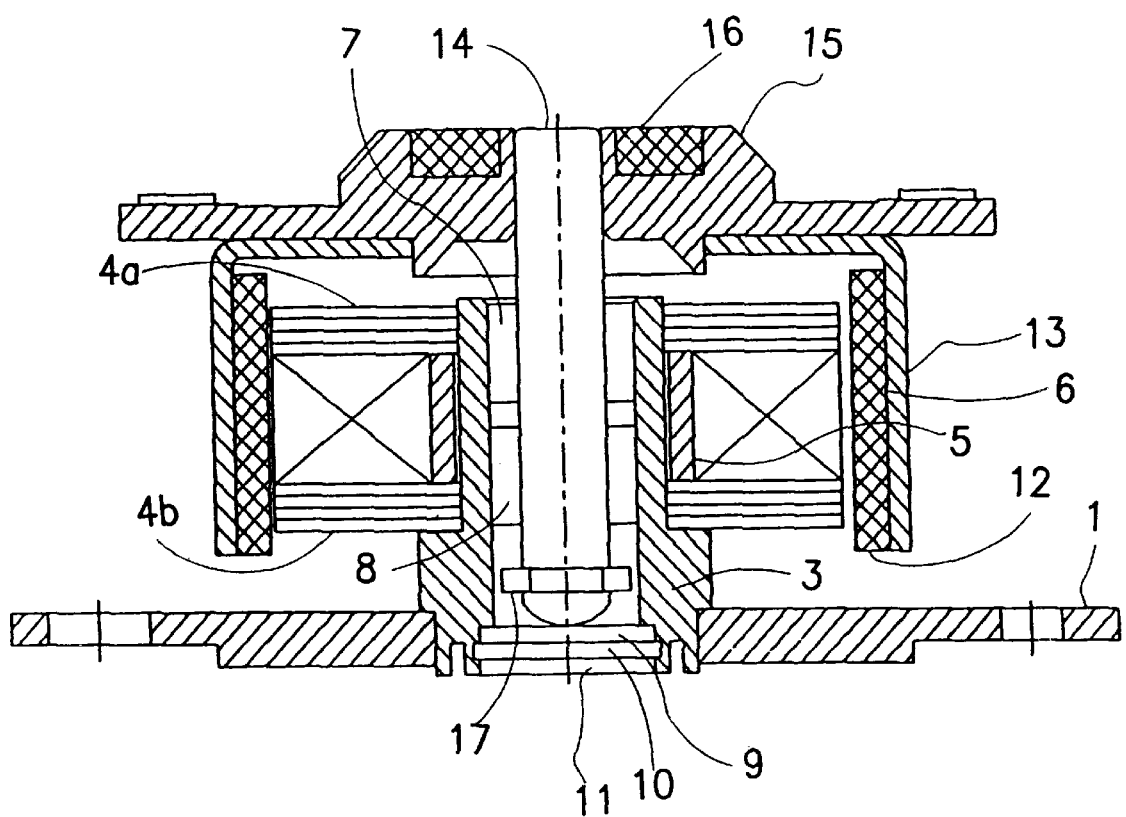
FIG. 1 is a schematic cross-sectional diagram of the spindle motor for a disc drive according to the present invention.

In the rotor 200, as shown in FIG. 3, the turntable 15 is coupled axially to the spindle 14 so that the spindle 14 can spin the turntable 15, which will in turn spin a CD-ROM disc (not shown) positioned on the turntable 15. The turntable 15 should be mounted at precise right angle with respect to the axis of the spindle 14 so that the turntable 15 can be rotated levelly without undulation. The ring-shaped magnet 12 surrounds the 12-pole structure formed by the tooth-like portions 41 on the upper and bottom salient-pole pieces 4a, 4b. The 12-pole structure allows for an increased output torque of the motor. The ring-shaped magnet 12 is inset in the yoke 13. The combined ring-shaped magnet 12 and yoke 13 are then coupled axially to the spindle 14 beneath the turntable 15. After this, the spindle 14 is inserted into the bore 33 in the flux-guiding sleeve 3 so as to couple the rotor 200 to the stator 100. As shown in FIG. 1, the top end of the ring-shaped magnet 12 is 20 separated by a height to the upper and bottom salient-pole pieces 4a, 4b. This allows the rotor 200 to be attracted firmly by the stator 100 such that the turntable 15 can be rotated levelly without undulation. The stator 100 and the rotor 200 is separated by a radial gap of 0.2 mm to 0.5 mm.

In the driving circuit 300, as shown in FIG. 4, the Hall sensor 21 is positioned on 25 the upper and bottom salient-pole pieces 4a, 4b to detect the variation of the magnetic fields in the ring-shaped magnet 12 of the rotor 200. The Hall sensor 21 can generate a train of pulses whose rate indicates the speed of the rotor 200. The phase-adjuster 23 receives this pulse train from the Hall sensor 21 to thereby generate a driving signal with an optimal phase angle to drive the motor. The phase-adjuster 23 includes a phase-lead filter 231, a phase-lag filter 232, and a switching circuit 233. The phase-lead filter 231 is capable of processing the pulse train to thereby generate an output signal having an optimal phase lead which can drive the motor in an optimal manner. Similarly, the phase-lag filter 232 is capable of processing the pulse train to thereby generate an output signal having an optimal phase lag which can drive the motor in an optimal manner. The switching circuit 233 is under control by the control unit 24 to switch the transferring of the pulse train either to the phase-lead filter 231 or the phase-lag filter 232. In the case of phase lead, the switching circuit 233 transfers the pulse train to the phase-lead filter 231; while in the case of phase lag, the pulse train is transferred to the phase-lag filter 232. The output signal of the phase-adjuster 23 is further processed by the control unit 24 and bridge-type circuit 25 and then transferred via the electrical contacts 22 to the coil 61. This excites the coil 61 and thus drives the motor.

Figure 5:
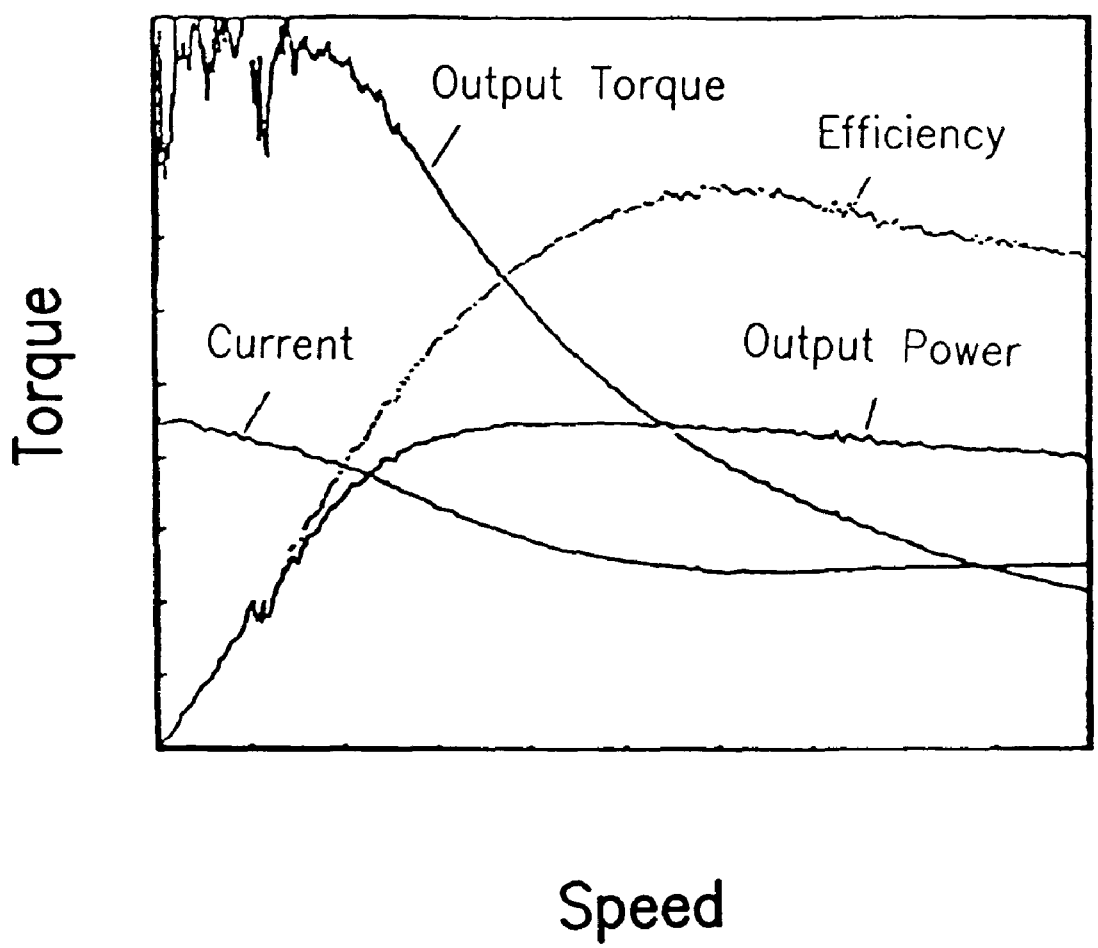
FIG. 5 is a graph showing the output characteristics of the spindle motor of the invention.

FIG. 5 is a graph plotting the output characteristics of the spindle motor of the invention when used in conjunction with a CD-ROM drive to spin an optical disc. Referring to FIG. 5, the graph shows that the output characteristics of the brushless motor of the invention meet the requirements of high-speed CD-ROM drives. This spindle motor also allows the CD-ROM drive to drive Audio CDs and Video CDs.

Compared with the prior art, the spindle motor of the invention has the following two distinctive features. First, the peak surfaces of the tooth-like portions 41 of the upper and bottom salient-pole pieces 4a, 4b in the stator 100 are formed into a symmetrical convex shape with a small radius of curvature, which allows the cogging torque of the motor to be minimized. Second, the use of the phase-adjuster 23 in the driving circuit 300 allows the motor to produce large output torque at high speeds.

The principle and structure of the foregoing two features are disclosed in full detail in the co-filed applications "Brushless Motor Stator Design" and "Automatic Phase Adjuster for A Brushless Motor Driving Signal" mentioned at the beginning of this specification. For information, please refer to the specifications of these two applications.

In conclusion, the brushless motor of the invention provides the following benefits. First, its structure allows for easy winding of the coil and low manufacturing cost. Second, the upper and bottom salient-pole pieces 4a, 4b each have six tooth-like portions 41 interleaved at an electrical angle of 180° so as to form a 12-pole structure that allows for an increase in the output torque of the motor and also a decrease in the variation of the motor speed. Third, the peak surfaces of the tooth-like portions 41 of the upper and bottom salient-pole pieces 4a, 4b in the stator 100 are formed into a symmetrical convex shape with a small radius of curvature, which minimizes the cogging torque of the motor. Fourth, the valley portions between the tooth-like portions 41 are formed into a concave curvature, which allows for a decrease in the amount of magnetic flux flowing therethrough, which will in turn increase the flux linkage. As a result, the output torque of the motor can be increased. Fifth, the flux-guiding sleeve 3 and flux-guiding ring 5 are made of high magnetism and low conductivity materials, so that insulation is provided therebetween and eddy currents are reduced. This also allows the coils to be made thin. Further, the flux-guiding ring 5 can be made by using a non-crystallitic alloy which is wound into a plurality of turns instead of the above-mentioned stack structure. Sixth, the use of the phase-adjuster 23 in the driving circuit 300 allows the motor to produce large output torque at high speeds. Seventh, the use of the single-phase winding and bridge-type circuit 25 allows the motor to produce large torque and efficiency.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A spindle motor of a single-phase axial-winding and radial-gap type for a disc drive to spin a disc, comprising:
    a stator having a plurality of tooth-like portions serving as salientpoles, each tooth-like portion having a peak surface formed into a symmetrical convex shape, the symmetrical convex shape of said tooth-like portions of said stator allowing for a decrease in the cogging torque of said spindle motor, said stator further including
        a pair of salient-pole pieces including an upper salient-pole piece and a bottom salient-pole piece, each being formed by a stack of silicon steel having a plurality of tooth-like portions serving as a plurality of poles, said upper and bottom salient-pole pieces being interleaved at an electrical angle of 180° so as to form a doubled number of salient-poles,
        a flux-guiding ring, coupled between said upper and bottom salient-pole pieces, for providing a flux path between said upper and bottom salient-pole pieces,
        a bobbin which fits over said flux-guiding ring,
        a coil, wound around said bobbin, for excitation of the salientpoles formed on the upper and bottom salient-pole pieces,
        a flux-guiding sleeve for axially coupling said bottom salient-pole pieces, said flux-guiding ring, and said upper salient-pole piece thereon, said flux-guiding sleeve being made of a magnetic material having a bore and a supporting flange for supporting said bottom salient-pole piece when said bottom salient-pole piece is axially coupled on said flux-guiding sleeve,
        a plurality of bearings coupled axially in the bore of said flux-guiding sleeve,
        a mounting member made of a non-magnetic material and coupled securely to said flux-guiding sleeve by means of fastening to the coupling mouth on said flux-guiding sleeve, and
        a circuit board, mounted on said mounting member, for mounting a driving circuit for the spindle motor thereon;
    a rotor, coupled to said stator, so as to be rotated by said stator, said rotor including
        a turntable for positioning the disc thereon,
        a spindle for turning said turntable, said spindle having a circular slot formed near the bottom end thereof,
        a ring-shaped magnet coupled axially to said spindle and said upper and bottom salient-pole pieces on said stator, and
        a yoke enclosing said ring-shaped magnet;
    a frictional piece for supporting said spindle when said rotor is coupled to said stator;
    a stopper for supporting said frictional piece;
    a spindle locking ring for insetting in said circular slot formed on said spindle so as to lock said spindle in position when said rotor is coupled to said stator; and
    a stopper locking ring for locking said stopper in position.

2. A spindle motor of a single-phase axial-winding and radial-gap type for a disc drive to spin a disc, comprising:
    a stator having a plurality of tooth-like portions serving as salientpoles, each tooth-like portion having a peak surface formed into a symmetrical convex shape, the symmetrical convex shape of said tooth-like portions of said stator allowing for a decrease in the cogging torque of said spindle motor;
    a rotor, coupled to said stator, so as to be rotated by said stator; and
    a driving circuit, coupled to said stator, for supplying an excitation serving as a driving signal to said stator to rotate said rotor, wherein said driving circuit includes:
        a Hall sensor, coupled to said rotor, for detecting the speed of said rotor to thereby generate a pulse train whose rate indicates the speed of said rotors,
        a phase-adjuster, coupled to said Hall sensor, for processing said pulse train to thereby generate a driving signal,
        a control unit, coupled to said phase-adjuster, for switching the output of said phase-adjuster between a phase-lead driving signal and a phase-lag driving signal, and
        a bridge-type circuit, coupled to receive the driving signal from said phase-adjuster, for generating an excitation signal to said stator so as to rotate said rotor.

3. A spindle motor of a single-phase axial-winding and radial-gap type for a disc drive to spin a disc, which comprising:

a stator;

a rotor, coupled to said stator, so as to be rotated by said stator; and a driving circuit, coupled to said stator, for supplying an excitation signal serving as a driving signal to said stator to rotate said rotor;

wherein said stator includes:

a pair of salient-pole pieces including an upper salient-pole piece and a bottom salient-pole piece, each being formed by a stack of silicon steel having a plurality of tooth-like portions serving as a plurality of salientpoles, said upper and bottom salient-pole pieces being interleaved at an electrical angle of 180° so as to form a doubled number of salientpoles;

a flux-guiding ring, coupled between said upper and bottom salient-pole pieces, for providing a flux path between said upper and bottom salient-pole pieces;

a bobbin which fits over said flux-guiding ring;

a coil, wound around said bobbin, for excitation of the salientpoles formed on the upper and bottom salient-pole pieces;

a flux-guiding sleeve for axially coupling said bottom salient-pole piece, said flux-guiding ring, and said upper salient-pole piece thereon, said flux-guiding sleeve being made of a magnetic material having a bore and a supporting flange for supporting said bottom salient-pole piece when said bottom salient-pole piece is axially coupled on said flux-guiding sleeve;

a plurality of bearings coupled axially in the bore of said flux-guiding sleeve;

a mounting member made of a non-magnetic material and coupled securely to said flux-guiding sleeve by means of fastening to the coupling mouth on said flux-guiding sleeve; and a circuit board, mounted on said mounting member, for mounting a driving circuit for the spindle motor thereon; and wherein said rotor includes:

a turntable for positioning the disc thereon;

a spindle for turning said turntable, said spindle having a circular slot formed near the bottom end thereof;

a ring-shaped magnet coupled axially to said spindle and said upper and bottom salient-pole pieces on said stator; and a yoke enclosing said ring-shaped magnet;

and wherein said driving circuit includes:

a Hall sensor, coupled to said rotor, for detecting the speed of said rotor to thereby generate a pulse train whose rate indicates the speed of said rotor;

a phase-adjuster, coupled to said Hall sensor, for processing said pulse train to thereby generate a driving signal;

a control unit, coupled to said phase-adjuster, for switching the output of said phase-adjuster between a phase-lead driving signal and a phase-lag driving signal; and a bridge-type circuit, coupled to receive the driving signal from said phase-adjuster, for generating an excitation signal to said stator so as to rotate said rotor.

4. A spindle motor of a single-phase axial-winding and radial-gap type for a disc drive to spin a disc, comprising:

a stator having a plurality of tooth-like portions serving as salientpoles, each tooth-like portion having a peak surface formed into a symmetrical convex shape, the symmetrical convex shape allowing for a decrease in the cogging torque of said spindle motor;

a rotor, coupled to said stator, so as to be rotated by said stator; and a driving circuit, coupled to said stator, for supplying an excitation signal serving as a driving signal to said stator to rotate said rotor, wherein said driving circuit includes:

a speed sensor for sensing the speed of said spindle motor to thereby generate a speed signal indicative of the current speed of said spindle motor; and a phase-adjuster, responsive to said speed signal, for adjusting the phase of the driving signal to allow the spindle motor to output optimal torque at high speed.

5. The spindle motor of claim 4, wherein said phase-adjuster includes:

a phase-lead filter for processing said speed signal to thereby generate a phase-lead driving signal to said stator;

a phase-lag filter for processing said speed signal to thereby generate a phase-lag driving signal to said stator;

a switching circuit for switching the transferring of said speed signal between said phase-lead filter and said phase-lag filter, in the case of phase lead, said switching circuit transfers said speed signal to said phase-lead filter; while in the case of phase lag, said switching circuit transfers said speed signal to said phase-lag filter.

6. The spindle motor of claim 4, wherein said driving circuit further includes:

a control unit coupled to said switching circuit in said phase-adjuster; and a bridge-type circuit coupled to said control unit.

7. The spindle motor of claim 6, wherein said speed sensor is a Hall sensor which generate a pulse of trains whose rate indicates the speed of said spindle motor to said phase-adjuster.

* * * * *